United States Patent
Hansen et al.

(10) Patent No.: US 7,424,526 B1
(45) Date of Patent: Sep. 9, 2008

(54) INTERNET SERVICE NODE INCORPORATING A BANDWIDTH MEASUREMENT DEVICE AND ASSOCIATED METHODS FOR EVALUATING DATA TRANSFERS

(75) Inventors: Kevin H. Hansen, Shawnee, KS (US); Mark Wendling, Overland Park, KS (US); Walt Weber, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 655 days.

(21) Appl. No.: 09/919,430

(22) Filed: Jul. 31, 2001

(51) Int. Cl.
*G06F 15/173* (2006.01)
*G06F 15/16* (2006.01)
*H04L 12/26* (2006.01)

(52) U.S. Cl. .................... 709/224; 709/218; 709/233; 370/232

(58) Field of Classification Search ............... None
See application file for complete search history.

(56) References Cited

U.S. PATENT DOCUMENTS

| | | | |
|---|---|---|---|
| 5,477,531 A * | 12/1995 | McKee et al. | 370/249 |
| 5,974,237 A * | 10/1999 | Shurmer et al. | 709/224 |
| 6,085,241 A * | 7/2000 | Otis | 709/223 |
| 6,415,323 B1 * | 7/2002 | McCanne et al. | 709/225 |
| 6,532,495 B1 * | 3/2003 | Welles et al. | 709/232 |
| 6,578,077 B1 * | 6/2003 | Rakoshitz et al. | 709/224 |
| 6,601,009 B2 * | 7/2003 | Florschuetz | 702/124 |
| 6,614,763 B1 * | 9/2003 | Kikuchi et al. | 370/252 |
| 6,757,255 B1 * | 6/2004 | Aoki et al. | 370/252 |
| 6,788,649 B1 * | 9/2004 | Dugan et al. | 370/254 |
| 6,813,244 B1 * | 11/2004 | He et al. | 370/235 |
| 6,996,067 B1 * | 2/2006 | Burke et al. | 370/248 |

OTHER PUBLICATIONS

"Bandwidth Speed Test"; Bandwidth Place, 12 pages.*
Bandwidthspeedtest.com, www.bandwidthplace.com/speedtest/, p. 1.
DSL Reports: "About Speed," www.dslreports.com/speed, pp. 1-6.
DSL Reports: "Speed Tests," www.dslreports.com/stest, p. 1.
DSL Reports.com: "Testing Your Broadband Connection," www.dslreports.com/tools, p. 1.
Web ProForum Tutorials, CN Nettest, "Asynchronous Transfer Mode (ATM) Testing," The International Engineering Consortium, www.iec.org., pp. 1-33.
Web ProForum Tutorials, Cornet Technology, "Digital Subscriber Line (DSL) Testing," The International Engineering Consortium, www.iec.org, pp. 1-16.

* cited by examiner

*Primary Examiner*—John B. Walsh (57) ABSTRACT

The present invention is directed to a intranet for providing on-demand Internet access to subscribers which includes a service node and a plurality of subscriber terminals coupled to the service node by corresponding xDSL lines. In turn, the service node includes a switch coupled to the xDSL lines, a gateway coupled to the Internet, a router which couples the switch to the gateway and a bandwidth measurement server coupled to the gateway. The bandwidth measurement server determines upload and/or download data transfer rates between the service node and requesting ones of said the subscriber terminals coupled thereto.

10 Claims, 4 Drawing Sheets

INTERNET SERVICE NODE INCORPORATING A BANDWIDTH MEASUREMENT DEVICE AND ASSOCIATED METHODS FOR EVALUATING DATA TRANSFERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a method and apparatus for measuring bandwidth between a subscriber and a service node for the subscriber's internet service provider ("ISP"). By generating a baseline measurement for the bandwidth between the subscriber and the service node operated by the ISP and providing a device which enables subsequent measurements of the bandwidth between those points by the subscriber, the origin of degradations in service may be more readily identified.

BACKGROUND OF THE INVENTION

Most personal computer ("PC") users obtain access to the Internet through an ISP. Typically, the PC user will establish a connection between their PC and a server operated by the ISP using either a modem and phone line or a dedicated line, commonly known as a digital subscriber line ("xDSL"), installed by the ISP, a competitive local exchange carrier ("CLEC"), or a local or long distance telephone company. Once the PC user has established a connection with the ISP, the ISP is responsible for establishing and maintaining a connection with the Internet for the PC user.

The bandwidth of a data transmission system is determined based upon the speed at which data can be transferred between two points within the system. Thus, for a PC or other computer system connected to the Internet, the downstream bandwidth is the speed, in bits per second, that data can be transferred (or "downloaded") to the PC from the Internet while the upstream bandwidth is the speed, in bits per second, that data can be transferred (or "uploaded") from the PC to the Internet. When connected to a selected site on the Internet, a variety of factors can dramatically affect both downstream and upstream bandwidth. For example, a poorly configured PC, a substandard connection with the ISP, an overloaded gateway to the Internet, an overloaded Internet backbone, an excessive hop count to the selected Internet site or an inadequate server at the selected site may all adversely affect bandwidth.

A web site known as "DSLreports.com" enables PC users to test their broadband connection by performing upload and download speed tests between the user's PC and a test server maintained by the aforementioned web site. The DSLreports.com web site also maintains a summary of all tests performed by the user. Unfortunately, the results of tests such as those offered by DSLreports.com have been misinterpreted by many Internet users. Internet users typically obtain access to the Internet by entering into a service agreement with an ISP. Oftentimes, the ISP promises to provide certain upload and download speeds, commonly referred to as "rated speeds", to the Internet user, particularly when the ISP offers a dedicated line such as a xDSL line. After entering into a contract with an ISP promising a certain level of service, an Internet user may misinterpret speed reports such as those generated by DSL reports.com as evidencing upload and download speeds below the rated speeds promised by the ISP. Such mistaken beliefs oftentimes lead to the Internet user becoming dissatisfied with their ISP and may even motivate the cancellation of their service agreement.

However, deficient upload and download data transfer rates can result from a variety of problems, many of which are beyond the control of the ISP. More specifically, the ISP is only responsible for the connection between a subscriber's PC and the ISP's internet gateway. The cause of a deficient upload or download data transfer rate, on the other hand, may reside within the PC itself or at a internet location well removed from that portion under the control of the ISP. Accordingly, this invention improves on current techniques for testing upload and download data transfer rates by providing a service node uniquely configured for determining bandwidth between the node itself and clients thereof. By determining bandwidth to and/or from the service node, those deficiencies in service which can be readily addressed by the ISP are discernable from those that are beyond the control of the ISP.

SUMMARY OF THE INVENTION

In one embodiment thereof, the present invention is directed to a service node for coupling a client to a network having at least one server. The service node includes a gateway configured for connection to the network, a switch configured for connection to the client, and a data routing system extending between the switch and the gateway. Collectively, the switch, data routing system and gateway form a path, through the service node, configured for coupling the client to the network. Coupled to the path and forming part of the service node is a bandwidth measurement device configured for determining upload and/or download data transfer rates between the client and the service node. In one aspect thereof, the data routing system is comprised of a router coupled to the switch and the gateway and, in another, the bandwidth measurement device is coupled to the gateway. In still others, the client may be a PC, the switch may be an ATM edge switch, the bandwidth measurement device may be a server, and the network may be the Internet.

In further aspects of this embodiment of the invention, the bandwidth measurements are performed by a measurement application which resides on the bandwidth measurement server. The measurement application determines upload data transfer rates based upon an analysis of arriving data packets originating at the client. For download data transfer rates, the measurement application generates data packets for transfer to the client. The measurement application may further include an applet suitable for download to the client. For upload data transfer rates, the downloaded applet generates the data packets originating at the client and, for download data transfer rates, the downloaded applet analyzes data packets generated the measurement application upon arrival at the client. Once acquired, the upload and download data transfer rates may be retained within a measurement database coupled to the bandwidth measurement server.

In another embodiment of the present invention, a similarly configured service node is incorporated into an intranet for providing on-demand Internet access to subscribers coupled to the service node by xDSL lines. In this embodiment, the bandwidth measurement device is configured for determining upload and/or download data transfer rates between the service node and requesting ones of a plurality of subscriber terminals which access the bandwidth measurement device. In one aspect of this particular embodiment of the invention, the intranet further includes a service provider terminal coupled to the router of the service node and, in another, data maintained in the measurement database of the bandwidth measurement server may be accessed through the service provider terminal.

In still further embodiments thereof, the present invention is directed to associated methods which utilize a measurement of a data transfer rate between a terminal and an internet access node to determine useful information. In one such method, performance of an internet service provider is evaluated over time by comparing the measured data transfer rate to a previously measured baseline data transfer rate. In another, degradations in service are determined if the measured data transfer rate is below the baseline data transfer rate by more than a pre-selected threshold value. In still another, the variance between the measured data transfer rate and a rated speed for the internet service provider is determined. In accordance with this method, if the variance is within an acceptable range, it is determined that any below-rated speed data transfers are outside the control of the internet service provider.

DETAILED DESCRIPTION OF THE INVENTION

Figure 1:
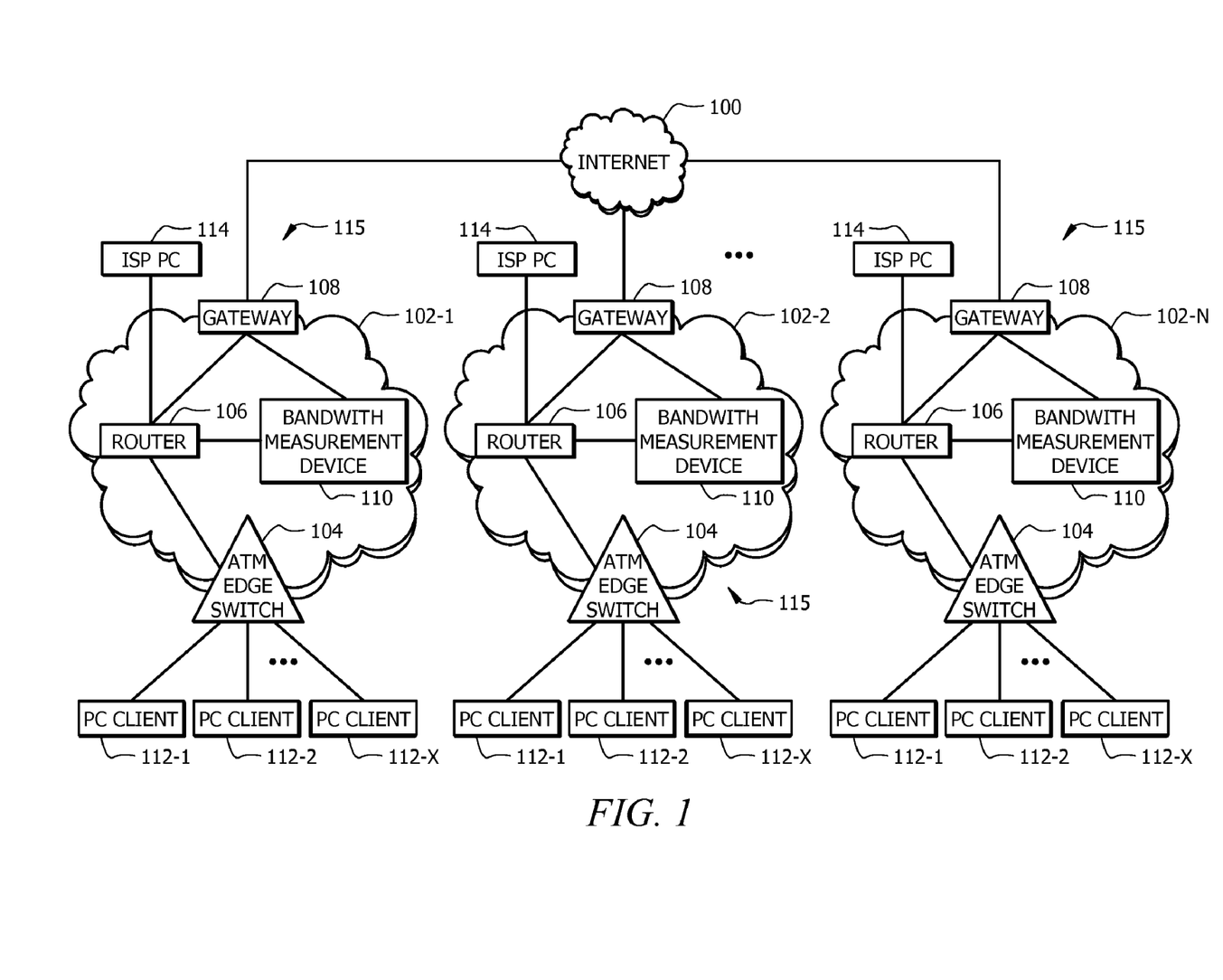
FIG. 1 is a block diagram of a network containing plural access nodes, each equipped with a bandwidth measuring device for determining transfer speeds to and/or from clients thereof.

Referring now to FIG. 1, a network 100, for example, the Internet is comprised a plurality of interconnected computer systems (not shown), commonly referred to as web servers, which exchange data using the transmission control protocol/internet protocol ("TCP/IP"). Individual subscribers can access the Internet 100 through an access node located on the edge of the Internet 100, for example, access nodes 102-1 through 102-N. As disclosed herein, each of the access nodes 102-1 through 102-N are service nodes which include an asynchronous transfer mode ("ATM") edge switch 104. However, in alternate embodiments of the invention, one or more of the access nodes 102-1 through 102-N may be a digital loop carrier ("DLC") system, a cellular antenna site, a private branch exchange ("PBX"), an optical network unit ("ONU") or another type of access node.

The aforementioned ATM edge switch 104 provides access, to end users, commonly referred to as subscribers, operating clients 112-1 through 112-X to a corresponding one of the service nodes 102-1 through 102-N. In addition to the ATM edge switch 104, each one of the service nodes 102-1 through 102-N includes a router 106 for routing data packets between selected locations within the corresponding service node and a gateway 108 which controls access to the Internet 100 via the corresponding service node. Collectively, the ATM edge switch 104, the router 106 and the gateway 108 form a path, through the corresponding one of the service nodes 102-1 through 102-N, for the clients 112-1 through 112-X served by that service node. Finally, each one of the service nodes 102-1 through 102-N includes a bandwidth measurement device 110 for determining upload and download data transfer rates between a client initiating a bandwidth measurement test and the service node which provides the client with access to the Internet 100. Of course, it should be clearly understood the foregoing description of a service node has been greatly simplified and that numerous components and devices thereof have been omitted from the drawings. For example, FIG. 1 shows, for each service node 102-1 through 102-N, a single router, specifically, the router 106, as coupling all of the various devices residing within that service node. In actuality, however, the router 106 should be viewed as being representative of the plural routers which more typically reside within a service node and which collectively couple the various devices residing therein. Furthermore, while it is fully contemplated that the clients 112-1 through 112-X encompass all of the various types of electronic devices capable of accessing the Internet 100, for illustrative purposes, FIG. 1 shows all of the clients 112-1 through 112-X as PCs.

Together, a service node and the clients served by that service node, for example, the service node 102-1 and the clients 112-1 through 112-X, form an intranet 115. Also forming part of the intranet 115 is a computer system 114, for example, a PC, coupled to the router 106. The PC 114 is operated by the ISP operating the service node 102-1 to which it is attached and, as will be more fully described below, may be used by a service technician employed by the ISP to evaluate bandwidth measurement tests performed by the clients 112-1 through 112-X served by the service node 102-1. For example, in response to a complaint by a subscriber that download and/or upload data transfer rates are below the rated speeds promised by the ISP, the service technician may use the ISP PC 114 to review the bandwidth measurement tests forming the basis for the subscriber's complaint.

Figure 2:
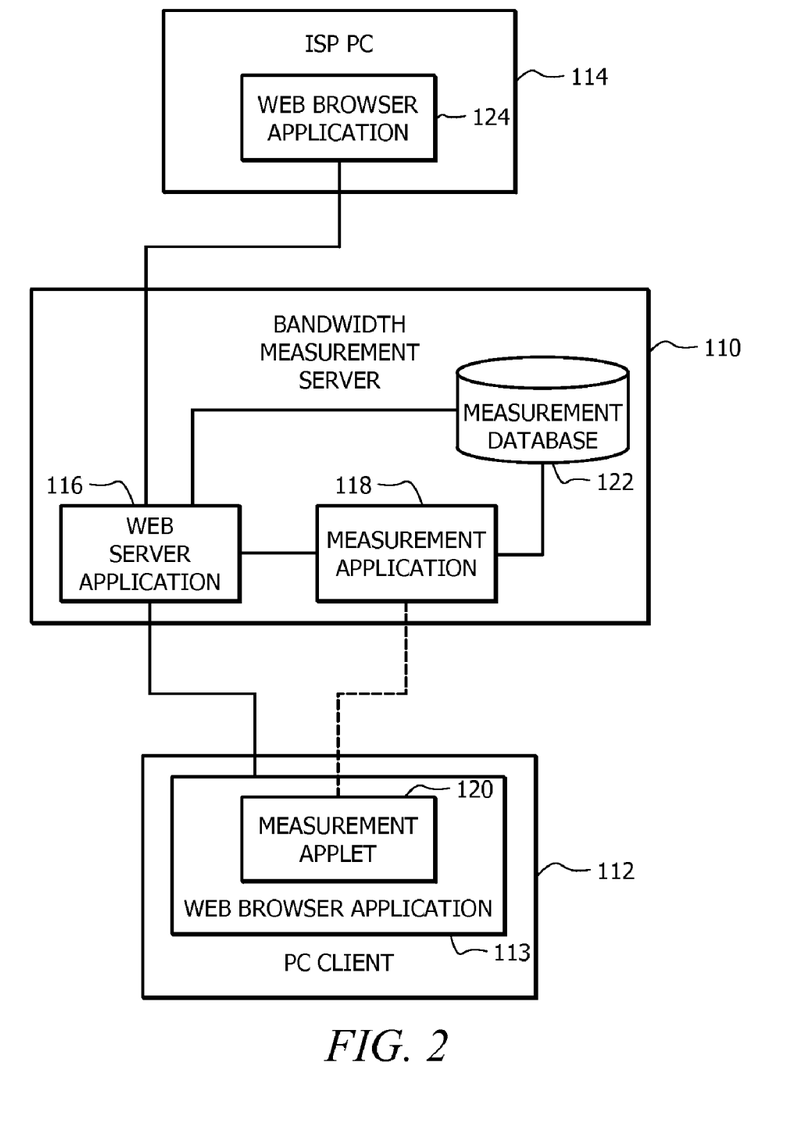
FIG. 2 is an expanded block diagram of the bandwidth measuring device of a selected one of the plural access nodes of FIG. 1 and computing systems respectively operated by a client and a service provider for the access node.

Referring next to FIG. 2, the structure of a selected bandwidth measurement device, for example the bandwidth measurement device 110 residing within the service node 102-1, a selected client, for example the client 112-1, which may access the bandwidth measurement device 110 to determine download and/or upload data transfer rates between the service node 102-1 and the client 112-1 and the ISP PC 114 which may access the collected data will now be described in greater detail. As may now be seen, the client 112-1 is a conventionally configured PC having processor and memory subsystems (not shown). Residing on the memory subsystem and executable by the processor subsystem is a web browser application, for example, Microsoft Explorer 4.0 or Netscape Navigator 4.7, which enables the client 112-1 to access applications and view documents residing on servers located within the service node 102-1 or elsewhere on the Internet 100. The ISP PC 114 is similarly configured to the client 112-1, with a web browser application 124 which enables it to access applications and data on servers located within the service node 102-1 or elsewhere on the Internet 100. Like the client 112-1, the web browser application 124 resides on a memory subsystem (not shown) of the ISP PC 114 and is executable by a processor subsystem (also not shown) thereof.

Finally, like the client 112-1 and the ISP PC 114, the bandwidth measurement server 110 is a computer system, although, most likely, the bandwidth measurement server 110 would be more powerful than either the client 112-1 or the ISP PC 114. The bandwidth measurement server 110 includes processor and memory subsystems (not shown). Residing in the memory subsystem and executable by the processor subsystem are a web server application 116 and a measurement server application 118. The web server application 116 works with the web browser applications 113 and 124 to enable access to applications and data residing on the bandwidth measurement server 110. More specifically, in response to a request by the client 112-1 to determine download or upload data transfer rates, the web server application 116 initiates execution of the measurement server application 118 which performs these tests in the manner more fully described below. The measurement server application 118 stores data collected while determining download and upload data transfer rates in measurement database 122 where it may be retrieved later by either the client 112-1 or the ISP PC 114, again in a manner to be more fully described below.

It should be noted that, while, in the embodiment of the invention disclosed herein, the web server application 116 and the measurement application 118 reside on a common server—the bandwidth measurement server 110, it is contemplated that, in an alternate embodiment of the invention, the web server application 116 and the measurement application 118 may instead reside on respective servers. It is further contemplated that the measurement database 122 may be off-loaded from the bandwidth measurement server 110 onto a separate platform or, if desired, may be configured as a resource shared by and accessible to all of the service nodes 102-1 through 102-N and/or all of the ISP PCs 114.

Figure 3:
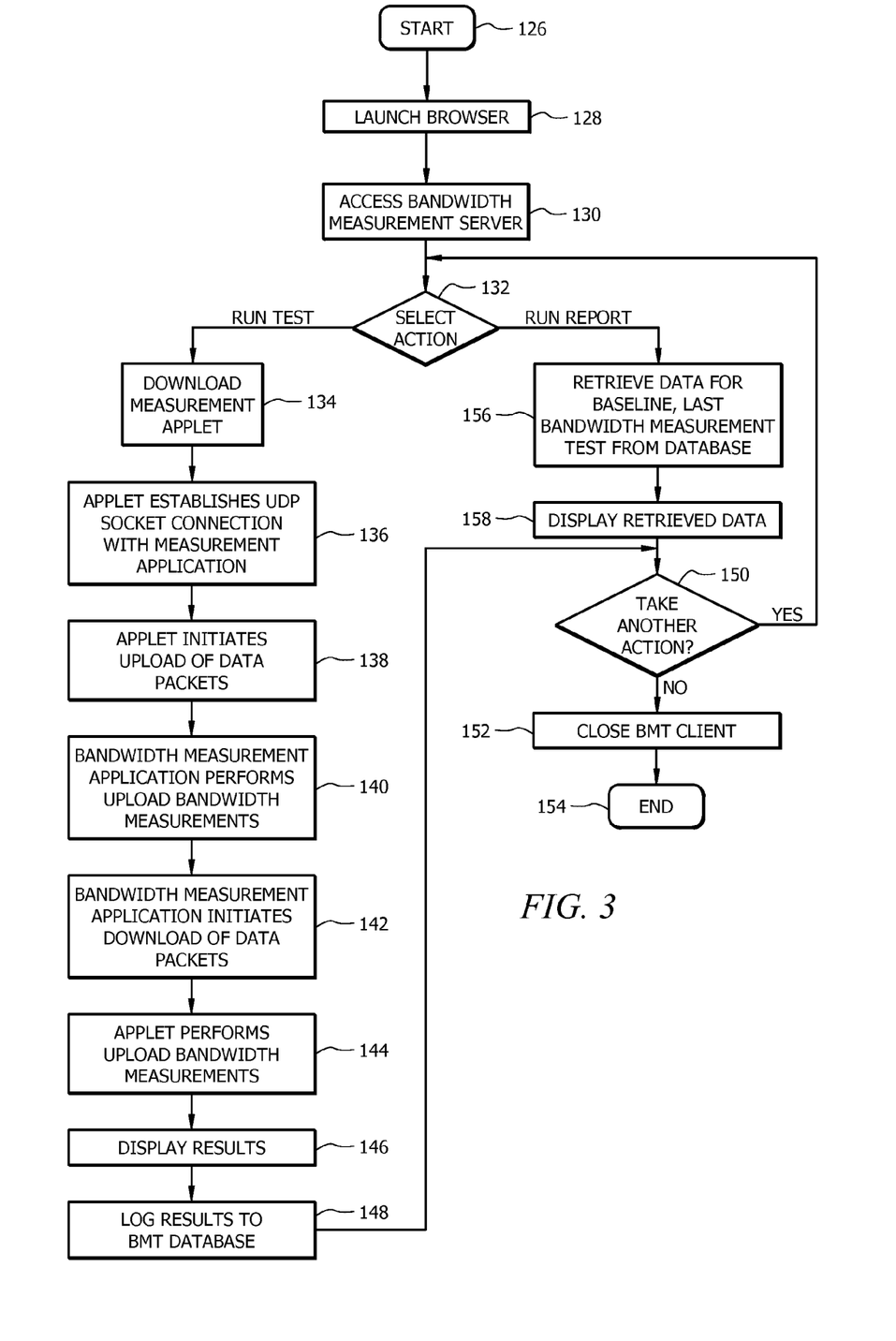
FIG. 3 is a block diagram of a method of measuring a data transfer speed between the client and the access node.

Referring next to FIG. 3, an associated method by which the client 112-1 utilizes the bandwidth measurement server 110 to determine both downstream and upstream data transmission rates will now be described in greater detail. The method commences at step 126 and, at step 128, a user operating the client 112-1 launches the web browser application 113. Continuing on to step 130, if the user operating the client 112-1 wishes to determine downstream and upstream data transfer rates between the client 112-1 and the service node 102-1, the user then initiates an access of the bandwidth measurement server 110 by entering the Universal Resource Locator (URL) for the bandwidth measurement server 110 into the web browser application 113 and initiating a request for connection to that IP address. Upon receipt of the request for connection to the URL for the bandwidth measurement server 110, the router 106 establishes a connection between the bandwidth measurement server 110 and the client 112-1.

To establish the aforementioned connection between the bandwidth measurement server 110 and the client 112-1, the router directs the request for connection to the indicated URL to the gateway 108. There, the gateway 108 determines that the requested URL is within the service node 102-1 and, rather than forwarding the request onto the Internet 100, directs the request to the bandwidth measurement server 110. By connecting the bandwidth measurement server 110 to the client 112-1 through the gateway, certain benefits are achieved. Specifically, when upload and download data transfer rates between the bandwidth measurement server 110 and the client 112-1 are measured, the resultant data transfer rates are those between the client 112-1 and the closest point of connection between the client 112-1 and the Internet 100, i.e., the gateway 108. As a result, the acquired data provides is particularly useful in discerning whether below-rated speed data transfer rates are due to problems within the service node 102-1 where the ISP can better effect remedial action or are due to problems outside the service node and most likely outside the control of the ISP.

Of course, it is contemplated that the router 106 may be configured to couple the client 112-1 to the bandwidth measurement server 110 using a more direct path. By doing so, however, it should be realized that, the usefulness of the acquired data could be reduced. For example, if the router 106 established a direct connection with the bandwidth measurement server 110 that avoided the gateway 108 completely, problems along the path between the router 106 and the gateway 108 which were causing data transfer rates to drop, would be masked.

Returning to step 130, upon initiating an access of the bandwidth measurement server, the web server application 116 proceeds to generate a graphical user interface ("GUI") from which the user may access the bandwidth measurement application to initiate tests of the downstream and upstream data transfer rates between the client 112-1 and the service node 102-1. It should be appreciated that, while a wide variety of GUIs may provide the desired interface with the user, it is contemplated that, at a minimum, the GUI should have an information box containing instructions for the user to perform the test and plural buttons, the respective depression thereof will initiate an action. It is further contemplated that the GUI should be suitable for use by both the user of the client 112-1 and the service technician operating the ISP PC 113. Accordingly, certain instructions and/or test buttons forming part of the GUI may not be available to the user and/or the service technicians. For example, password protection may be used to prevent the user from initiating certain actions from the GUI which should only be initiated by the service technician.

Proceeding on to step 132, the user selects an available action. In the embodiment of the invention disclosed herein, there are three actions which may be accessed from this interface: (1) run a normal bandwidth measurement test; (2) run a baseline bandwidth measurement test; and (3) run a bandwidth report for a specific IP address. Of these actions, the second is not normally available to the user. As defined herein, a "baseline" bandwidth measurement test is an initial bandwidth measurement test used for comparison to subsequent bandwidth measurement tests run at a later point in time. Preferably, the baseline bandwidth measurement test is run the first time that the client 112-1 accesses the service node 102-1. For example, a service technician often installs an xDSL line for a new subscriber. After installing the xDSL line and establishing an initial connection with the service node 102-1, the service technician should run a baseline bandwidth measurement test.

The baseline bandwidth measurement test performs a variety of useful functions. For example, the test will confirm if the service node 102-1 is transferring data at the rated speed at installation. After the baseline bandwidth measurement test has been performed, the data acquired during the test is stored in the measurement database 122 where it may be retrieved for subsequent analysis. For example, degraded performance of the service node 102-1 can be detected if a subsequent bandwidth measurement test is a selected value below the baseline measurement test. To preserve the data acquired during the baseline bandwidth measurement test, it is preferred that the baseline bandwidth measurement test be password protected using a password unknown to the user. Alternately, the GIU could be configured to allow only one baseline measurement test to be run before the corresponding button is disabled. Such an approach would be useful if the user performs the initial installation of the connection to the service node 102-1 without assistance from a technician.

Returning to step 132, if the user selects the "RUN BANDWIDTH MEASUREMENT TEST" action, the method proceeds to step 134 where the web server application 116 issues an instruction which causes the measurement application 118 to begin execution. Upon initiating execution, the measurement application 118 downloads a measurement applet 120 to the client 112-1. The measurement applet 120 is a JAVA applet which, when downloaded to the web browser application 113 of the client 112-1, executes in conjunction with the measurement application 118 to perform the requested bandwidth measurement test for the user. Preferably, in conjunction with the downloading of the measurement applet 120, a message advising the user that the bandwidth measurement applet 120 is downloading should be transmitted to the web browser application 113 for display.

After the measurement applet 120 has been downloaded, the method proceeds to step 136 for commencement of the bandwidth measurement test. At this step, the measurement applet 122 establishes a user datagram protocol ("UDP") socket connection between the client 112-1 and the bandwidth measurement server 110. Of course, other protocols within the TCP/IP suite would be suitable for exchanges between the client 112-1 and the bandwidth measurement server 110, particularly those protocols which, like UDP, neither uses acknowledgements nor guarantees packet delivery. Preferably, in conjunction with the establishment of the UDP socket connection between the client 112-1 and the bandwidth measurement server 110, a message advising that the measurement applet 120 is establishing a UDP connection (shown in phantom in FIG. 2) with the measurement application 118 of the bandwidth measurement server 110, as well as a subsequent message that the connection has been successfully established, should be transmitted to the user should be generated on the display of the client 112-1.

Depending on usage of the bandwidth measurement server 110, it may be necessary for the measurement application 120 to pause before initiating the data transfer rate tests at step 138. For example, to enhance accuracy of the tests, the measurement application 120 should pause until other activity on the client 112-1 has ended. Additionally, if other clients, for example, one or more of the clients 112-2 through 112-X are performing bandwidth measurement tests, the measurement application 120 should wait until the other users have completed their tests. Again, if a pause is necessary before initiating the data transfer rate tests, the measurement application 120 should transmit an appropriate message for display at the client 112-1.

Once the measurement application and measurement applet 118 and 120 are ready, the method proceeds to step 138 where the measurement applet 120 initiates an upload bandwidth measurement test by flooding the socket connection with UDP packets generated thereby. Preferably, the measurement applet 120 should generate generally incompressible UDP packets of varying sizes to better simulate actual network traffic. Each UDP packet generated by the measurement applet 120 and uploaded to the measurement application 118 should have a field containing a sequence number. The measurement application 118 counts the number of UDP packets received over a pre-selected time period and, from this count over time, can determine an upload data transfer rate. The measurement application 118 also counts bit errors and packets lost. Bit errors may be counted by placing known data in the payload of each UDP packet. The measurement application 118 may then compare the payload of the arriving UDP packets to the known data and determine a bit error count from the differences therebetween. Alternately, bit errors may be counted using a cyclic redundancy check ("CRC") on the arriving UDP data packets. Lost packets may be counted by comparing the count of arriving UDP data packets to the highest sequence number identified within the received stream of UDP data packets. Preferably, during the upload data rate test, the measurement application 120 should transmit a message for display at the client 112-1 indicating that the upload bandwidth measurement test is being conducted.

Again, depending on usage of the measurement application 118 and/or the measurement applet 120, after completing the upstream bandwidth measurement test, it may be necessary for the measurement application 118 to pause before initiating the downstream bandwidth measurement test at step 140. For example, to enhance accuracy of the tests, the measurement application 118 may pause until other activity on the client 112-1 has ended. Additionally, if other clients, for example, one or more of the clients 112-2 through 112-X are performing bandwidth measurement tests, the measurement application 118 would wait until the other users have completed their tests. Again, an appropriate message should be generated by the measurement application 118 for transmission to the client 112-1.

Once the measurement application and measurement applet 118 and 120 are ready to proceed, the method continues to step 142 where the measurement application 118 initiates a download bandwidth measurement test by flooding the socket connection with UDP packets generated thereby. The method then proceeds on to step 144 where the measurement applet 120 measures the download data transfer rate. The method of performing the download bandwidth measurement test of steps 142 and 144 is similar to the previously described upload bandwidth measurement test except that the functionality of the measurement application 118 and the measurement applet 120 are reversed. Thus, those actions previously performed by the measurement application 118 are now performed by the measurement applet 120 while those functions performed by the measurement applet 120 are now performed by the measurement application 118. Accordingly, as before, it is preferred that the measurement application 118 generate generally incompressible UDP packets of varying sizes and that each UDP packet generated by the measurement application 118 and downloaded to the measurement applet 120 should have a field containing a sequence number. The measurement applet 120 counts the number of UDP packets received over a pre-selected time period and, from this count over time, can determine a download data transfer rate. The measurement applet 120 also counts bit errors and packets lost. As before, bit errors may be counted by placing known data in the payload of each UDP packet and then comparing the payload of the arriving UDP packets to the known data to determine the bit error count. Alternately, a CRC check may be performed on the arriving UDP data packets. Lost packets are counted by comparing the count of arriving UDP data packets to the highest sequence number identified within the received stream of UDP data packets. Preferably, during the download data transfer rate test, the measurement application 120 should transmit a message for display at the client 112-1 indicating that the download bandwidth measurement test is being conducted.

After completing the downstream bandwidth measurement test at step 144, the method proceeds to step 146 where a report containing the results of both the upstream and downstream bandwidth measurement tests is generated for display by the client 112-1. Typically, the report will contain the download speed and upload data transfer rates in Mbits per second for the client 112-1 and the determined latency for transmitting data between the client 112-1 and the bandwidth measurement server 110. Preferably, the report will also contain the definition of the term "Mbits" as 1,000,000 bits per second and a comparison of the download and upload data transfer rates to those of a conventional 56K modem. Finally, it is contemplated that the generated report may contain suggestions on how to improve data transfer rates, for example, by adjusting the configuration of the client 112-1.

Proceeding on to step 148, the measurement application 118 stores the results of the bandwidth test in the measurement database 122. Typically, the measurement application 118 will store the IP address (or another unique identifier) of the client 112-1 for which the test was performed, the date and time of the test, the upload and download data transfer rates measured during the test, the latency for data transmissions, the upload and download bit error rate, and the upload and download packet loss rate. If desired, the acquired data may be stored in a log file rather than the measurement database 122 illustrated in FIG. 2.

The method then proceeds on to step 150 where the measurement application 118 re-generates the aforedescribed GUI from which the user previously initiated the "RUN BANDWIDTH MEASUREMENT TEST" action. If the user decides to select another action, the method returns to step 132, and, from step 132 to a next action selected by the user. For example, if the selected next action is to perform another bandwidth measurement test, the method would again proceed through steps 134 through 150 in the manner previously described. If, however, the selected action is "RUN BANDWIDTH REPORT", the method proceeds to step 156 where the web server application 116 retrieves, from the measurement database 122, the baseline and most recent bandwidth measurement tests for the client 112-1. Continuing on to step 158, the web server application 116 generates a display of the baseline and most recent bandwidth measurement tests for review of the user of the client 112-1. Preferably, the display will be similar to that generated at the end of a normal bandwidth test except that the same information is displayed for the baseline bandwidth test. By reviewing the baseline and most recent bandwidth measurement tests, the user can determine if there has been a detectable deterioration in the service provided by their ISP.

As will be more fully described below, the measurement database 122 maintains data acquired for all bandwidth measurement tests performed for the client 112-1, as well as the data acquired for the clients 112-2 through 112-X. However, in the embodiment disclosed herein, only the information for the baseline and most recent normal bandwidth tests are provided to the client 112-1 upon request. No information regarding bit error or lost measurements for any bandwidth tests is provided to the client 112-1. Nor is any information provided regarding normal bandwidth tests other than the most recent normal bandwidth test. Finally, no information regarding any bandwith measurement tests performed for the clients 112-2 thorough 112-X is available to the client 112-1. Accordingly, as the same GUI is used by a service technician operating the ISP PC 114 to access all of the acquired data for all of the clients 112-1 through 112-X, the web application 116 must be able to determine the appropriate amount of data to provide upon request. Various techniques may be used to accomplish this objective. For example, upon receiving a "RUN BANDWIDTH REPORT" action, the web server application 116 may ask for the IP address of the client for which the data is to be provided. The web server application 116 may then compare the received IP address to the IP address of the requesting PC. If the IP addresses match, the web server application 116 will determine that the request is being issued by a user at the client 112-1 and will transmit the limited amount of bandwidth data provided to users. Conversely, if the IP addresses do not match, the web server application 116 will determine that the request is being issued by a service technician at the ISP PC 114 and will transmit the more detailed information made available to service technicians. Of course, if desired, like the baseline measurement test, the transmission of detailed bandwidth data to the ISP PC 114 may be password protected.

The method then proceeds to step 150 where the web server application 118 again re-generates the aforedescribed GUI and the user must again decide whether to initiate yet another action. If no other actions are to be initiated, the user closes the GUI, and, if no other internet browsing is desired, closes the web browser application 114 as well. Having closed the web browser application 114 at step 152, the method then ends at step 154.

Figure 4:
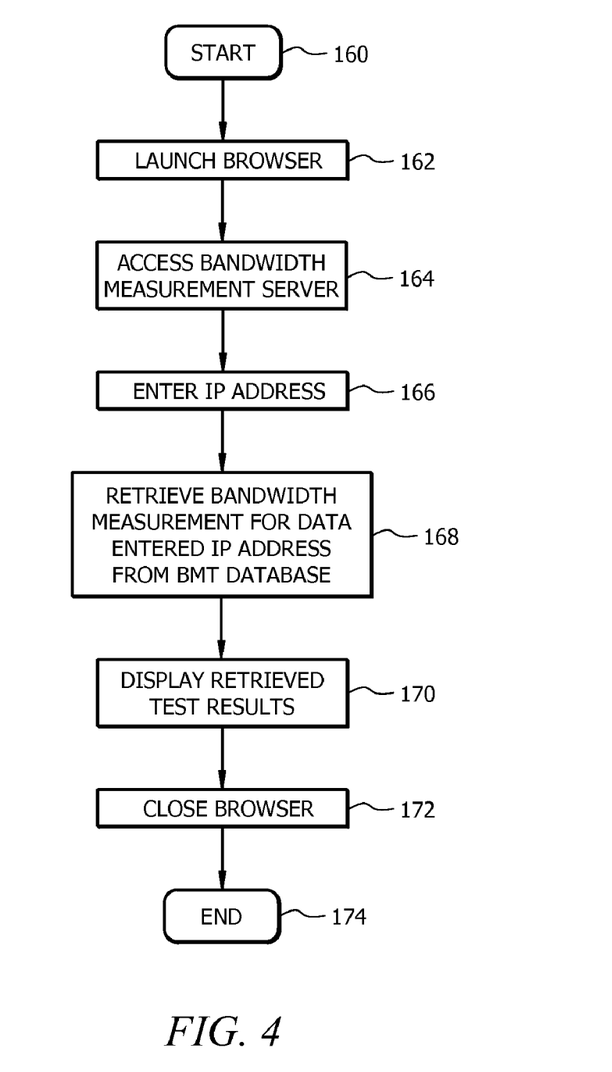
FIG. 4 is a block diagram of a method of accessing data acquired during the measuring of the data transfer speed between the client and the access node.

Referring next to FIG. 4, the method by which the service technician accesses bandwidth measurement data for a selected client, for example, the client 112-1, from the ISP PC 114, will now be described in greater detail. The method commences at step 160 and, at step 162, the service technician launches the web browser application 124. Like the web browser application 113, at step 164, the web browser application 116 accesses the web server application 116 residing on the bandwidth measurement server 110. Unlike the above-described method, however, the router 106 may couple the two directly and not route the connection through the gateway 108.

Proceeding on to step 166, the web server application 116 again generates the same GUI produced when accessed by clients. Here, however, only the third, "RUN BANDWIDTH REPORT" action has particular use to the service technician when evaluating the performance of a selected one of the clients 112-1 through 112-X. Accordingly, at step 166, the service technician selects the "RUN BANDWIDTH ACTION" and, upon request for an IP address, enters the IP address for the selected one of the clients 112-1 through 112-X for which the service technician wishes to review the performance thereof. Upon receipt of the IP address and upon recognition of the requesting terminal as the ISP PC 114, the web server application 116 retrieves the data acquired during bandwidth measurement tests for the requested client at step 116 and, at step 170, displays the retrieved data for review by the service technician. Upon completing a review of the retrieved data, the service technician closes the web browser application at step 172 and the method ends at step 174.

By reviewing the bandwidth measurement data displayed at step 172, the service technician can evaluate performance of the service node 102-1. For example, if the normal bandwidth is noticeably lower than the baseline bandwidth for a client, a problem within the service node may exist, particularly if the same reduction has occurred in connection with plural terminals. The service technician would then be in position to initiate remedial action upon recognition of the cause of the drop in bandwidth. On the other hand, if the normal bandwidth closely tracks the baseline bandwidth, any below-rated data transfer speeds being experienced by a client are more likely caused by problems within the client or within the Internet 100 and is outside the control of the service technician. To consistently identify degradations in service, it may be useful to provide pre-selected variances which define whether a degradation has occurred. For example, 5% may be selected as a threshold value. Changes between the baseline and normal bandwidth measurements which are less than 5% would be deemed as a normal fluctuation, while a drop of 5% or more would be deemed as a degradation in service.

Thus, there has been described and illustrated herein, an internet service node which incorporates a bandwidth measurement device as well as associated methods for evaluating data transfers. However, those skilled in the art should recognize that numerous modifications and variations may be made in the techniques disclosed herein without departing substantially from the spirit and scope of the invention. Accordingly, the scope of the invention should only be defined by the claims appended hereto.

The invention claimed is:

1. A service node for coupling a remote client to a network having at least one server, said service node comprising:
   a) a gateway configured for connection to a network;
   b) a switch configured for connection to a remote client;
   c) a data routing system extending from said switch to said gateway, said switch, data routing system and gateway collectively forming a path, through said service node, configured for coupling said remote client to said network;
   d) a bandwidth measurement device coupled to said gateway, said bandwidth measurement device configured for independently determining upload or download data transfer rates of data packets transferred between said remote client and said gateway;
   e) a measurement application resident on said bandwidth measurement device, said measurement application determining said upload or download data transfer rates for said bandwidth measurement device, wherein said bandwidth measurement application pauses prior to determining said upload or download data transfer rates until other activity on said remote client has ended; and
   f) an applet maintained by said measurement application suitable for download to said remote client and configured for independently determining upload or download data transfer rates between said remote client and said gateway.

2. The service node of claim 1 wherein said data routing system is comprised of a router coupled to said switch and said gateway.

3. The service node of claim 1 wherein said switch is an ATM edge switch.

4. The service node of claim 1, wherein the service node is an internet service provider and said network is the Internet.

5. The service node of claim 1 wherein said bandwidth measurement device is a server.

6. The service node of claim 5, wherein a web application resides on said bandwidth measurement server, said remote client accessing said measurement application via said web application.

7. The service node of claim 6, wherein said bandwidth measurement server further comprises a measurement database coupled to said measurement application, said measurement database maintaining data collected during measurement of said upstream or downstream data transfer rates.

8. The service node of claim 1, wherein said bandwidth measurement device distinguishes the upload or download data transfer rate between the remote client and the gateway from the upload or download data transfer rate between the remote client and the network.

9. The service node of claim 1, wherein, when determining said upload data transfer rate between said remote client and said gateway, said downloaded applet generates said data packets originating at said remote client and, when determining said download data transfer rate between said gateway and said remote client, said downloaded applet determines said download data transfer rate based upon an analysis of said data packets generated by said measurement application upon arrival at said remote client.

10. The service node of claim 1, wherein said bandwidth measurement application further pauses prior to determining said upload or download data transfer rates until other remote clients coupled to said service node that are performing bandwidth measurement tests have completed their bandwidth measurement tests.

* * * * *